Aug. 22, 1950   F. W. WENZ   2,519,523
HYDRAULIC TRANSMISSION
Filed April 8, 1947   3 Sheets-Sheet 1
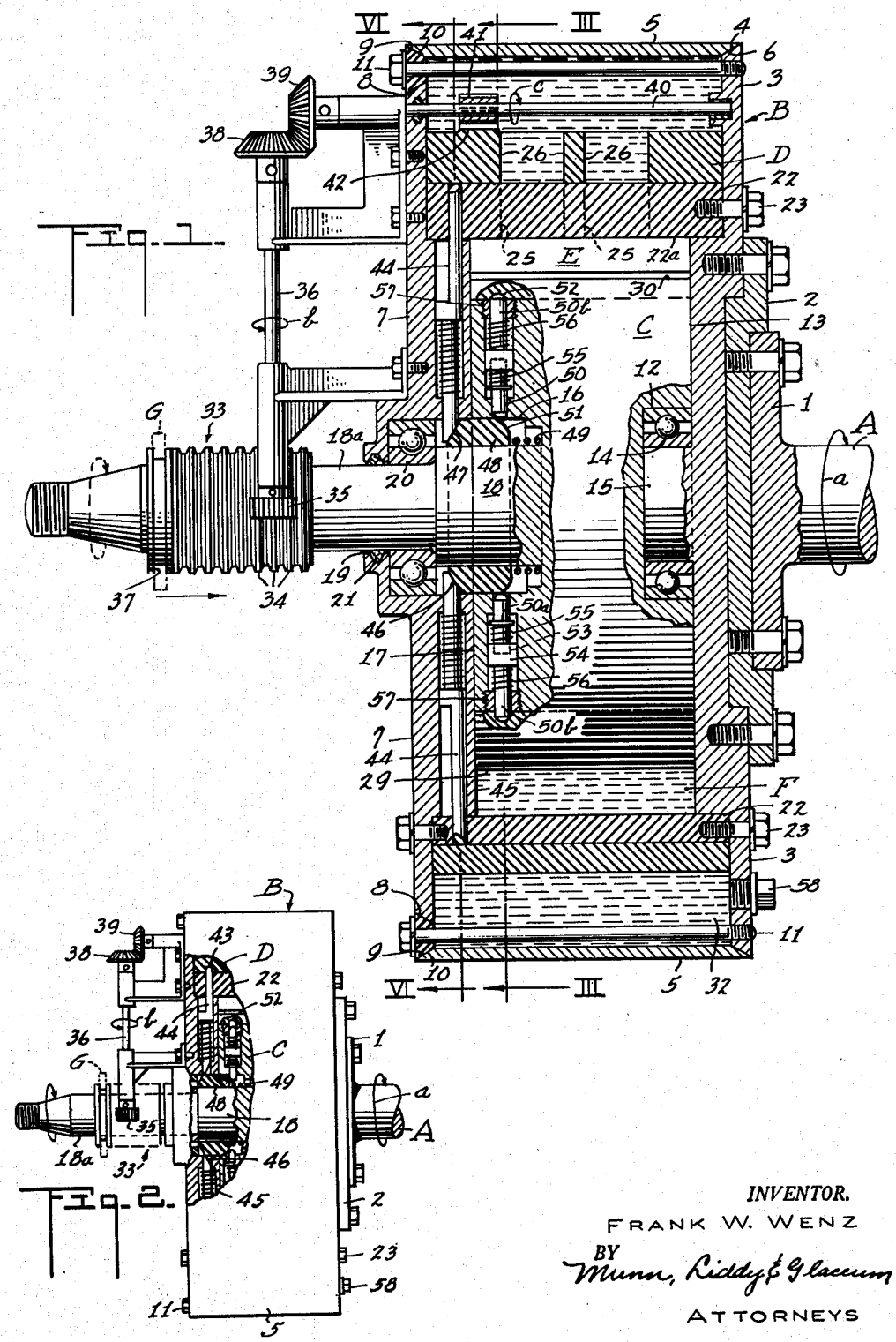
INVENTOR.
FRANK W. WENZ
BY
Munn, Liddy & Glaccum
ATTORNEYS

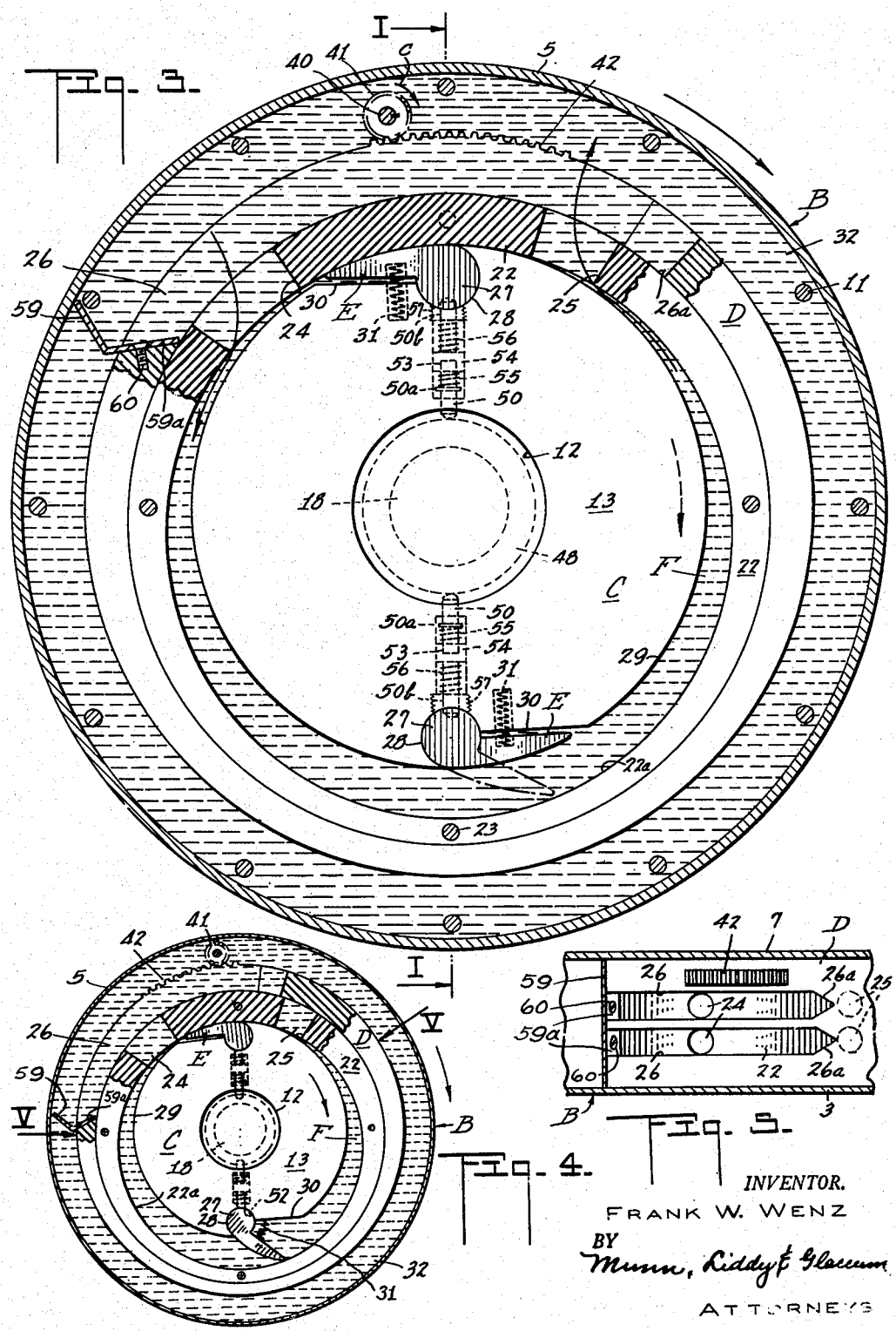

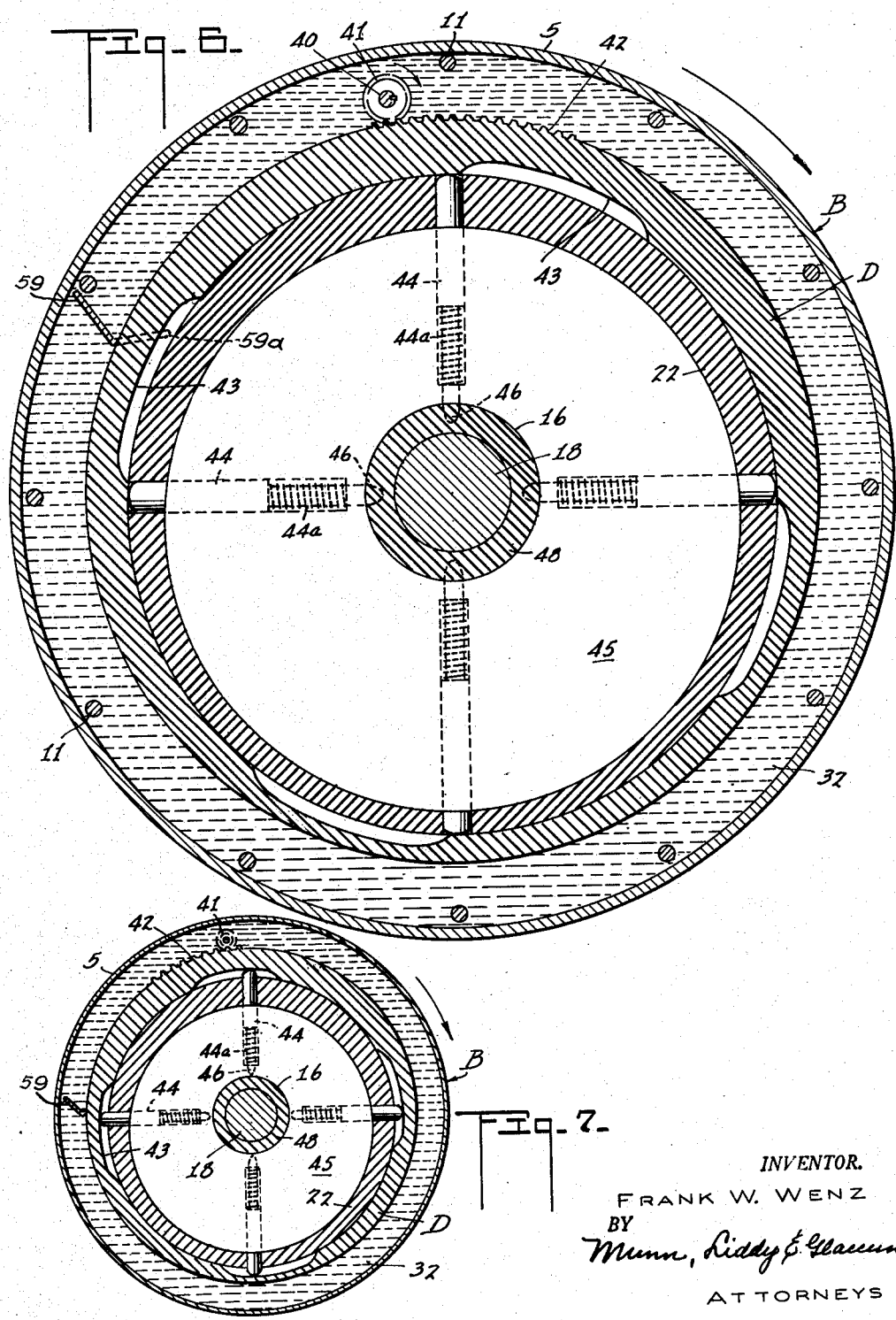

Patented Aug. 22, 1950

2,519,523

UNITED STATES PATENT OFFICE 2,519,523

HYDRAULIC TRANSMISSION

Frank W. Wenz, San Francisco, Calif.

Application April 8, 1947, Serial No. 740,207

5 Claims. (Cl. 192—58)

1

An object of my invention is to provide a hydraulic transmission in which a drive member is rotated by the crank shaft of an engine and is operatively connected by hydraulic means to a driven member which is connected to the propeller shaft of the vehicle. Either the drive or the driven member may be provided with swingable blades that move in a cylindrical chamber whose axis is eccentric to the member carrying the blades. Novel valve control means is used for controlling the flow of fluid in the chamber and it is this change of flow that determines the speed ratio between the drive and driven members. The valve mechanism is such that the drive member can rotate independently of the driven member when the parts are in "neutral" position and the driven member can be gradually coupled to the drive member for causing the former to rotate at any desired speed ratio with respect to the drive member up to direct connection with the drive member.

A further object of my invention is to provide novel means for maintaining the blades in inoperative position when the drive and driven members are in neutral position. This prevents the unnecessary movement of the blades and fluid while the parts are in neutral position.

A further object of my invention is to provide a device of the type described which is simple in construction and does away with the clutch and transmission which is usually provided between the engine and the propeller shaft of an automobile.

Other objects and advantages will appear in the following specification, and the novel features of the device will be particularly pointed out in the appended claims.

Figure 1 is a vertical section taken along the line I—I of Figure 3 and shows certain of the parts in elevation, the drive and driven members being shown in "neutral" position;

Figure 2 is a side elevation of the device on a reduced scale with portions being broken away to show the drive and driven members in direct drive connection;

Figure 3 is a vertical transverse section taken along the line III—III of Figure 1 and shows the drive and driven members in neutral position;

Figure 4 is a reduced view similar to Figure 3, but shows the drive and driven members in direct drive position;

Figure 5 is a section taken along the line V—V of Figure 4, and shows the control valve in direct drive position;

Figure 6 is a vertical transverse section taken

2 along the line VI—VI of Figure 1 and shows the parts in neutral position; and

Figure 7 is a reduced showing of Figure 6 with the parts shown in direct drive position.

While I have shown only the preferred form of my invention, it should be understood that various changes or modifications may be made within the scope of the appended claims without departing from the spirit and scope of the invention.

In carrying out my invention I make use of an engine crank shaft or other drive shaft indicated generally at A in Figure 1. The shaft rotates in the direction of the arrow $a$. The shaft A has a flange 1 which is secured to a coupling plate 2, the latter in turn being secured to a front plate 3 of a drive member indicated generally at B. The plate 3 has a bevelled peripheral edge 4 which receives a cylindrical wall 5, the wall having a bevelled edge 6 that contacts with the edge 4. A removable back plate 7 has a bevelled edge 8 that receives the bevelled edge of a ring 9. The ring is clamped against the edge 8 and against a second bevelled edge 10 of the wall 5 by stay bolts 11 to make a liquid-tight seal. The bolts 11 pass through openings in the ring 9 and are threaded into openings in the front plate 3. It will be seen from this arrangement that a housing is provided for the drive member B which can receive fluid and also receive the driven member.

The driven member is shown in elevation at C in Figure 3 and it has a recess 12 in its front wall 13 for receiving a bearing 14, see Figure 1. The bearing in turn is mounted on a stub shaft 15 which is integral with the front plate 3. The driven member C has an annular recess 16 in its rear wall 17 and a centrally disposed integral driven shaft 18 extends rearwardly from the driven member, through an opening 19 provided in the back plate 7. A bearing 20 supports the reduced portion 18a of the driven shaft. A packing 21 surrounds the reduced shaft portion 18a and prevents leakage of fluid through the opening 19.

Figures 1 and 3 illustrate an inner cylindrical wall 22 that has its inner surface 22a disposed eccentric to the axis of the driven member C. The axes of the drive and driven members are aligned with each other. The cylindrical wall 22 is secured to the housing B by cap screws 23 or other suitable fastening means. Figure 3 shows the wall 22 as having a fluid inlet opening 24 and a fluid outlet opening 25. In actual practice a plurality of inlet openings 24 are ranged side by side to extend in a longitudinal direction throughout the length of the cylindrical wall 22, see Figure 5. The same is true of the outlet openings 25. In Figure 5 I show two inlet openings 24 and I do not wish to be confined to any exact number of inlet or outlet openings.

A fluid control valve ring D encircles and rides on the cylindrical wall 22 and has a plurality of slots 26 that are designed to register with the inlet and the outlet openings 24 and 25. Figure 5 shows the slots registering with the inlet openings 24 and out of registration with the outlet openings 25. When the control valve ring D is in this position the drive and driven members are directly connected together as will be more fully explained hereinafter.

The driven member C has a plurality of blades E pivotally secured at a position adjacent to the periphery of the member, see Figure 3. I show two blades E, although I do not wish to be confined to any exact number. Each blade has a cylindrical end or base 27 that is rockably received in a cylindrical recess 28 formed in the periphery 29 of the driven member C. The recess 28 is enlarged on one side and has a flat edge 30 that extends from the cylindrical portion of the recess to the periphery 29. The enlarged recess portion receives the blade E when the latter is swung into inactive position. The outer edge of the blade is curved so as to form a continuation of the outer periphery of the driven member C when the blade is closed. A coil spring 31 normally urges the blade from the full line position shown in Figure 3 into the dot-dash line position where its outer edge will contact the wall 22a.

I provide novel means for locking the blades in inoperative position and this means is controlled by the relative rotation of the valve ring D with respect to the cylindrical wall 22. When the ring is in a position where its slots 26 fully uncover the inlet and outlet openings 24 and 25, the drive and driven members are in "neutral" position and the drive member will rotate independently of the driven member without actuating the latter. The blades could remain active while the parts are in neutral, but this would cause an unnecessary flow of fluid 32 from the housing B into the inner compartment F formed by the cylindrical wall 22, and a return flow from the compartment through the openings 25 and back into the interior of the housing 32. This continuous flow of fluid would not hinder the operation of the device, but would cause an unnecessary drag on the parts and the blades would be subjected to an unnecessary wear as well as drag so long as they continued to open and close during their rotative movement in the eccentric chamber F.

To overcome this I have provided the following mechanism to hold the blades inoperative during the time the parts are in neutral position. Referring to Figure 1, it will be seen that I mount a collar or control sleeve 33 on the reduced portion 18a of the drive shaft. This sleeve has a plurality of annular teeth 34 therein forming a cylindrical rack that meshes with a pinion 35 carried by a shaft 36. A control fork indicated by the dotted lines G is received in an annular groove 37 provided in the rack sleeve 33 and a manual or automatic shifting of the fork by a means not shown will cause the sleeve to slide along the shaft portion 18a in the desired direction.

The sleeve is shown in Figure 1 in a position where the drive and driven members are in "neutral" position. The cylindrical rack 33 is connected to the valve ring D by the pinion 35, shaft 36, bevel gears 38 and 39, a shaft 40 and a pinion 41 that meshes with a rack 42 on the valve ring. The center for the rack 42 is the same as the axis for the drive and driven members. When the sleeve rack 33 is in "neutral" position, as shown in Figure 1, the fluid control valve ring D will be in the position shown in Figure 3 with the inlet and outlet openings 24 and 25 in the cylindrical member 22, fully uncovered by the slots 26 in the valve ring. A free flow of fluid from the housing in the driving member B, through the inlet openings 24 and into the chamber F, and then from the chamber through the outlet openings 25 and back into the housing reservoir, will take place so long as the blades E remain in operative position.

The valve ring D while in "neutral" position will have its cam-shaped recesses 43, shown in Figure 6, out of registry with spring-pressed cam followers 44 and these will be depressed inwardly for causing their inclined ends 46 to contact with a conical end 47 of a cam sleeve 48, slidably mounted on the shaft 18, and move it to the position shown in Figure 1. I provide four cam followers 44 and space them 90° apart although I do not wish to be confined to any exact number. The cam followers are slidably carried by a plate 45 which is integral with the number 7.

When the cam sleeve 48 is in the "neutral" position shown in Figure 1, its opposite conical end 51 will move spring pressed pins 50 outwardly, see Figure 1, and will cause flanges 50a on the pins to compress springs 55 against enlarged heads 54, carried by outer pin sections 50b. The outer pin sections are in alignment with the pin sections 50. The heads 54 have recesses 53 for slidably receiving the outer ends of the pin sections 50. Coil springs 56 are disposed on the outer pin sections 50b and bear against the heads 54 and guide plugs 57. The aligned pin sections 50 and 50b are carried by the driven member C and when the springs 55 are compressed by the outward movement of the pin sections 50, sufficient compression is placed on these springs to overcome the compressive force of the springs 56 and to move the outer ends of the pin sections 50b into recesses 52, provided in the bases of the blades E, when the latter are swung into closed position by the eccentric wall surface 22a as it is rotated by the driving member B.

When once the blades are closed and the outer pin sections 50b enter the recesses 52, the blades will remain closed so long as the parts remain in neutral position. The blades will do no pumping of the fluid from the compartment F through the outlet openings 25. Moreover the outer edges of the blades will not ride on the eccentric surface 22a.

A movement of the sleeve rack 33 to the right in Figure 1, in order to connect the drive and driven members, will rotate the pinion 35, the shaft 36, bevel gears 38 and 39 and cause the valve ring D to move counterclockwise in Figures 3 and 6. The cam grooves 43 will move with the ring and will free the cam followers 44 and the coil springs 44a will move the followers outwardly and permit a coil spring 49, see Figure 1, to move the cam sleeve 48 to the left. This will free the pins 50 and release the compression on the springs 55. The pin flanges 50a will rest on the shoulders provided in the bores that receive the pins. The springs 55 will now exert less force than the springs 56 and the latter will act on the heads 54 to retract the outer ends of the pin sections 50b from the recesses 52, thus freeing the blades E. The springs 31 will now hold the blades in yielding contact with the wall 22a.

A gradual movement of the valve ring D to the left in Figure 3 resulting from the movement of the rack ring 33 to the right in Figure 1, will cause the V-shaped ends 26a of the slots 26 to gradually restrict the size of the outlet openings 25. The continued rotation of the driving member B in a clockwise direction, see Figure 3, will cause the blades E to move fluid from the inlet openings 24, through the crescent-shaped compartment F, and out the outlet openings 25, back into the liquid housing in the member B. The driven member C will remain stationary so long as the outlet openings 25 will not restrict the flow of fluid therethrough caused by the blades E.

A restriction of the size of the outlet openings by the gradual closing of the valve ring D, will retard the flow of fluid therethrough and will start to trap the fluid in the compartment F disposed between the outlet openings and the open blade E. When the force necessary to move the fluid through the restricted outlet openings equals the force necessary to start rotating the driven member C in a clockwise direction in Figure 3, the driven member will start to rotate. The speed ratio between the drive and driven members B and C equals the difference between the force necessary to move the fluid through the restricted outlet openings and the force needed to rotate the driven member. It will be seen from this that any desired speed ratio between the drive and driven members may be effected from neutral position up to direct drive position.

Figures 4 and 5 illustrate the direct drive position. The outlet openings 25 are fully closed and the fluid is trapped in the compartment F. Figure 2 also shows the parts in direct drive position although the cam followers 44 and the pin sections 50 and 50b will be in the positions indicated during the initial movement of the rack sleeve 33 from neutral into direct drive position. The return of the parts to neutral position is effected by a movement of the rack sleeve 33 from the position shown in Figure 2 into the position illustrated in Figure 1.

If the device is used in an automobile, and the car is ascending a grade, the desired "low gear ratio" between the drive and driven elements can be accomplished by restricting the outlet openings 25 to an extent which will permit the drive shaft A to rotate at a faster speed than the driven shaft 18. The reduced shaft portion 18a would be connected to the propeller shaft of the car by a universal joint, not shown.

From the foregoing description of the various parts of the device, the operation thereof may be readily understood.

The housing B is filled with fluid by removing a plug 58, and the fluid will fill the inner compartment F. The drive and driven members are shown in neutral positions in Figures 1, 3 and 6. This will permit the engine crank shaft A to rotate without rotating the driven shaft 18. The control valve ring D will have its slots 26 registering with both the inlet and outlet openings in the cylindrical wall 22; therefore fluid is free to enter the inner compartment F and to flow therefrom back into the interior of the housing B during the rotation of the drive member B. This flow is obviated by securing the vanes E in retracted position by the mechanism already explained.

When the operator wishes to connect the drive and driven members together, he actuates the control fork G to move the control sleeve 33 to the right in Figure 1 and to rotate the control valve rind D on the cylindrical member 22.

As the ring D is moved to the left in Figure 5 the flow of fluid out through the outlets 25 will be gradually restricted and the driven member will gradually be rotated faster and faster. When the outlet openings 25 are closed, the parts will be in direct drive position.

The device is self-contained and does away with the need of a transmission fly wheel or clutch. It is possible to turn the device end for end and have the member C become the driving member connected directly to the engine crank shaft and have the member B become the driven member and connected to the propeller shaft, not shown. In this event the blades E would swing outwardly due to centrifugal force as soon as released and the coil springs 31 would not be needed.

A baffle 59, see Figures 3, 4 and 5, is carried by the control valve ring D and is for the purpose of directing fluid from the member B into the inlet openings 24. The baffle extends from side to side of the member B and has lugs 59a that extend down into the slots 26 and screws 60 secure the lugs to the end walls of the slots. When the member B starts rotating, the fluid will through inertia contact the baffle 59 and be directed into the openings 24. This will keep the inner compartment F filled with fluid at all times.

I claim:

1. In a device of the type described, a rotatable driving member comprising a housing, an inner cylindrical wall in the housing and providing outer and inner fluid-receiving compartments, the inner surface of the inner wall being eccentric to the axis of rotation of the driving member, a driven cylindrical member mounted in the inner compartment and having a diameter less than that of the eccentric inner wall surface, the periphery of the driven member having a portion tangent with the inner eccentric surface, the inner wall having an inlet opening disposed on one side of the point of tangency and an outlet opening disposed on the other side of the point of tangency, a control valve ring encircling the inner wall and having slots adapted to uncover both the inlet and outlet openings when the ring is in "neutral" position, blades pivotally carried by the periphery of the driven member, yielding means for holding the outer end of each blade in slidable contact with the eccentric inner surface, a pin for each blade, each blade having a recess for receiving the pin when the blade is in inoperative position, spring means normally inactive for urging the pins into the recesses, a cam moveable for making the spring means active for holding the blades inactive the next time they are moved into this position by the rotating eccentric inner surface, cam followers for moving the cam for making the spring means active, cooperative means between the ring valve and cam followers for causing the latter to move the cam when the ring is rotated into "neutral" position.

2. In a device of the type described, a rotatable driving member comprising a housing, an inner cylindrical wall in the housing and providing outer and inner fluid-receiving compartments, the inner surface of the inner wall being eccentric to the axis of rotation of the driving member, a driven cylindrical member mounted in the inner compartment and having a diameter less than that of the eccentric inner wall surface, the periphery of the driven member having a portion tangent with the inner eccentric surface, the inner wall having an inlet opening disposed on one side of the point of tangency and an outlet opening disposed on the other side of the point of tangency, a control valve ring encircling the inner wall and having slots adapted to uncover both the inlet and outlet openings when the ring is in "neutral" position, blades pivotally carried by the periphery of the driven member, yielding means for holding the outer end of each blade in slidable contact with the eccentric inner surface, a pin for each blade, each blade having a recess for receiving the pin when the blade is in inoperative position, spring means normally inactive for urging the pins into the recesses, a cam moveable for making the spring means active for holding the blades inactive the next time they are moved into this position by the rotating eccentric inner surface, cam followers for moving the cam for making the spring means active, cooperative means between the ring valve and cam followers for causing the latter to move the cam when the ring is rotated into "neutral" position, control means disposed exterior of the driving member and operatively connected to the control valve ring for moving the latter from "neutral" position into a position for causing the slots to cover the outlet opening, the initial movement of the ring causing the cam followers to free the cam, spring means for returning the cam and making the spring means for the pins inactive, whereby the blades will become operative and a gradual closing off of the outlet opening by the control valve ring will gradually start and accelerate the rotation of the driven member until a complete closing of the outlet opening will create a direct drive between the drive and driven members.

3. In a device of the type described, a rotatable driving member comprising a housing, an inner cylindrical wall in the housing and providing outer and inner fluid-receiving compartments, the inner surface of the inner wall being eccentric to the axis of rotation of the driving member, a driven cylindrical member mounted in the inner compartment and having a diameter less than that of the eccentric inner wall surface, the periphery of the driven member having a portion tangent with the inner eccentric surface, the inner wall having an inlet opening disposed on one side of the point of tangency and an outlet opening disposed on the other side of the point of tangency, a control valve ring encircling the inner wall and having slots adapted to uncover both the inlet and outlet openings when the ring is in "neutral" position, blades pivotally carried by the periphery of the driven member, yielding means for holding the outer end of each blade in slidable contact with the eccentric inner surface, a driven axle integral with the driven member, a cam sleeve slidable on the axle, pins for holding the blades in inoperative position, the blades having recesses for receiving the pins when the blades are in inoperative position, spring means for causing the pins to enter the recesses when the spring means is compressed and when the recesses are again aligned with the pins, a cam follower carried by the inner wall, cooperative means between the cam follower and the control ring for causing the latter to move the cam to compress the spring means for the pins when the ring is moved into "neutral" position, the ring when moved out of "neutral" position to cause the slots to cover the outlet opening, initially freeing the cam follower, a cam moving spring for moving the cam when the latter is freed from the cam follower for making ineffective the spring means on the pins, and spring means for urging the pins out of the recesses when the other pin moving spring means is made ineffective.

4. In a device of the type described, a rotatable driving member comprising a housing, an inner cylindrical wall in the housing and providing outer and inner fluid-receiving compartments, the inner surface of the inner wall being eccentric to the axis of rotation of the driving member, a driven cylindrical member mounted in the inner compartment and having a diameter less than that of the eccentric inner wall surface, the periphery of the driven member having a portion tangent with the inner eccentric surface, the inner wall having an inlet opening disposed on one side of the point of tangency and an outlet opening disposed on the other side of the point of tangency, a control valve ring encircling the inner wall and having slots adapted to uncover both the inlet and outlet openings when the ring is in "neutral" position, blades pivotally carried by the periphery of the driven member, yielding means for holding the outer end of each blade in slidable contact with the eccentric inner surface, a pin for each blade, each blade having a recess for receiving the pin when the blade is in inoperative position, spring means normally inactive for urging the pins into the recesses, a cam moveable for making the spring means active for holding the blades inactive the next time they are moved into this position by the rotating eccentric inner surface, cam followers for moving the cam for making the spring means active, cooperative means between the ring valve and cam followers for causing the latter to move the cam when the ring is rotated into "neutral" position, control means disposed exterior of the driving member and operatively connected to the control valve ring for moving the latter from "neutral" position into a position for causing the slots to cover the outlet opening, the initial movement of the ring causing the cam followers to free the cam, spring means for returning the cam and making the spring means for the pins inactive, whereby the blades will become operative and a gradual closing off of the outlet opening by the control valve ring will gradually start and accelerate the rotation of the driven member until a complete closing of the outlet opening will create a direct drive between the drive and driven members, the control means operatively connected to the valve ring including a sleeve rack slidable on the axle, a second rack integral with the control ring, and mechanical connections between the two racks, whereby a longitudinal movement of the sleeve rack on the axle in one direction will move the valve ring toward "neutral" position and a longitudinal movement of the sleeve rack in the opposite direction will move the ring in the opposite direction for causing the slots to gradually close the outlet opening and effect a direct connection between the drive and driven members when the outlet opening is completely closed.

5. In a device of the type described, a rotatable driving member having an inner wall eccentric to the axis of rotation of the driving member, a driven cylindrical member having a diameter less than that of the eccentric inner wall and having a portion tangent with the inner wall, the inner wall having an inlet opening disposed on one side of the point of tangency and an outlet opening disposed on the other side of the point of tangency, blades pivotally carried by the periphery of the driven member, yielding means for holding the outer end of each blade in slidable contact with the eccentric inner wall, a pin for each blade, each blade having a recess for receiving the pin when the blade is in inoperative position, spring means normally inactive for urging the pins into the recesses, a cam movable for making the spring means active for holding the blades inactive the next time they are moved into this position by the rotating eccentric inner wall, and means for moving the cam for making the spring means active and including control means disposed exterior of the driving member.

FRANK W. WENZ.

REFERENCES CITED

The following references are of record in the file of this patent:

UNITED STATES PATENTS

| Number | Name | Date |
|---|---|---|
| 1,396,756 | Hughes | Nov. 15, 1921 |
| 1,418,126 | Cartledge | May 30, 1922 |
| 1,636,700 | McKinney | July 26, 1927 |
| 2,052,429 | Tyler | Aug. 25, 1936 |
| 2,172,089 | Peone | Sept. 5, 1939 |

FOREIGN PATENTS

| Number | Country | Date |
|---|---|---|
| 395,611 | France | Oct. 23, 1908 |